Aug. 2, 1927.

S. LEVITT 1,637,701

PIPE COUPLING

Filed July 13, 1920

Inventor
Samuel Levitt

By his Attorneys
Moses, Hammond & Middleton

Patented Aug. 2, 1927.

1,637,701

UNITED STATES PATENT OFFICE.

SAMUEL LEVITT, OF BROOKLYN, NEW YORK, ASSIGNOR TO UNITED METAL HOSE COMPANY, INC., OF NEW YORK, N. Y., A CORPORATION OF NEW YORK.

PIPE COUPLING.

Application filed July 13, 1920. Serial No. 395,928.

This invention relates to improvements in pipe connections or couplings adapted to be attached to the end of a flexible pipe or hose for connecting the same to another section of pipe or hose, or to whatever the pipe or hose is to be connected to. The coupling is especially adapted for hose utilized for delivering gasoline from a pump to the fuel tanks of automobiles, such hose being provided with couplings at each end, one of which is attached to the pump and the other to a suitable nozzle. Such hose is subjected to very severe usage which the construction of the present invention is well adapted to withstand. The coupling may be applied to flexible pipes formed of metal tubing, either alone or having outer or inner tubing formed of fabric, rubber or the like, or it may be used with hose formed of rubber or rubber and fabric, either covered or uncovered. The coupling is adapted to be quickly and easily applied to or removed from the flexible pipe without the aid of special tools; and when attached to the pipe the latter is firmly secured in position and against movement relative to the coupling. In the event of the pipe being ruptured the damaged portion of the pipe may be cut off and the coupling re-attached to the perfect part of the pipe, and as this may be done by any person it is not necessary to send the damaged pipe and coupling to a factory to have the repairs made. Provision is also made for forming a fluid-tight joint between the coupling and the pipe or hose. The coupling, moveover, consists of but few parts which are simple in construction and economical to manufacture.

Figure 1:
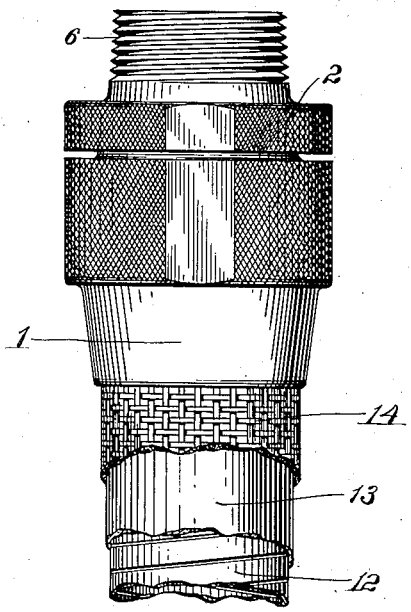

In the accompanying drawing, forming part of this specification, wherein I have shown a preferred embodiment of my invention for the purpose of illustrating the principle thereof, Figure 1 is an outside view showing the coupling applied to a flexible metal pipe having a rubber and fabric covering.

Figure 2:
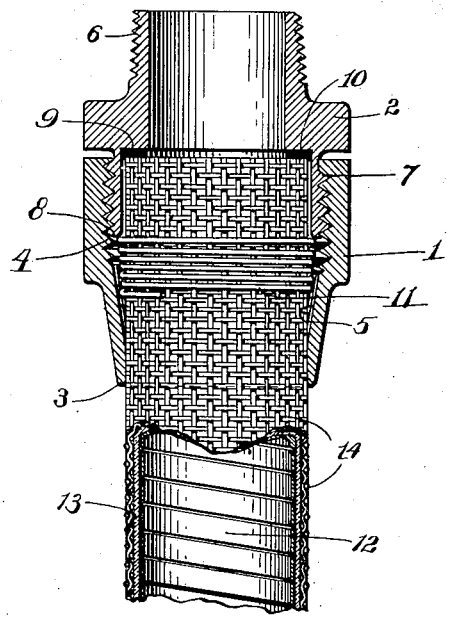
Figure 3:
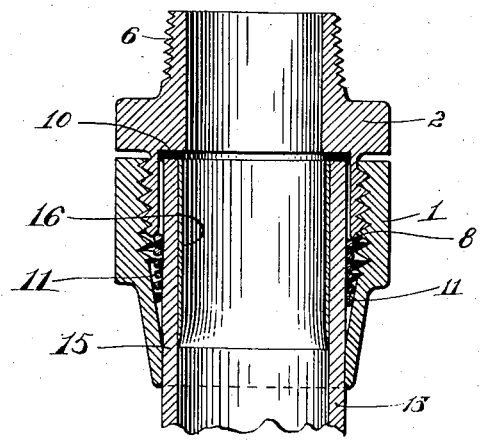

Figure 2 is a longitudinal view partly in section and partly in elevation of the assemblage shown in Figure 1, and Figure 3 is a view similar to Figure 2 showing the coupling applied to a rubber hose.

Referring to the drawing, the coupling in its preferred form includes a sleeve 1 and a coupling nut 2. The outer end of the bore of the sleeve is provided with a pipe engaging portion 3, and the inner end thereof, which is of greater diameter than the outer end, is provided with a thread 4. Intermediate its inner and outer portions, the bore is provided with a tapering portion 5 adapted to receive and engage the gripping member hereinafter described.

The coupling nut 2 is provided at its outer end with an externally threaded portion 6, or is otherwise suitably formed, to permit it to be connected with any desired duct member, nozzle or the like. At its inner end the coupling nut is provided with an externally threaded portion 7 adapted to receive the end of the pipe and to engage the thread 4 formed in the bore of the sleeve 1. The inner end of the portion 7 is preferably beveled somewhat as indicated at 8. Intermediate its ends the coupling nut is provided with an internal annular shoulder 9 adapted to register with the end of the pipe whereby suitable packing 10 may be compressed between the shoulder 9 and the end of the pipe. The packing 10 held tightly against the end of the hose prevents leakage at the coupling and prevents the liquid passing through the pipe from coming in contact with the outer layers of the pipe or hose. This is important when the outer coverings of the hose are made of a material likely to be injuriously affected by the substance which the hose is used to convey, as for instance when a rubber covered hose is used for gasoline.

The coupling further includes a gripping member 11 comprising a helical coil formed of wire, of any suitable size, the diameter of the coil being substantially equal to the diameter of the pipe to which the coupling is to be applied. The gripping member which is preferably, but not necessarily, formed of spring wire may be formed before being applied to the pipe, or it may be applied to the pipe by coiling the wire thereon, but in either case the direction of the coils should correspond to the direction of the threads formed on the inner ends of the sleeve and of the coupling nut.

In Figures 1 and 2 the coupling is shown, for purposes of illustration, as being applied to a pipe comprising a flexible metal tube 12, of any suitable construction having a covering consisting of tubular members 13 and 14 formed of suitable material such as rubber and fabric, respectively, it being of course understood that the coupling may be used with pipes of any other suitable construction.

To apply the coupling to the pipe the sleeve 1 is first slid upon the pipe a sufficient distance to permit of the gripping member 11 being positioned thereon, after which the gripping member is placed in position upon the pipe adjacent the end thereof either by sliding it upon the pipe when the gripping member is previously formed, or by coiling the wire around the end of the pipe, it being remembered that the coils should extend in the same direction as the threads on the interengaging portions of the coupling members 1 and 2. The sleeve is then slid towards the end of the pipe and over the gripping member to cause the inner end thereof to be received within the tapered portion 5 of the bore of the sleeve. The coupling nut 2, with the packing 10 in position, is then screwed into the sleeve 1. As the coupling nut is rotated to screw it into place the inner end of the threaded portion 7 will engage the end of the helically coiled gripping member 11, and as the rotating movement of the coupling nut is continued the inner end thereof will more forcibly engage the end of the gripping member causing the gripping member to be contracted or more tightly coiled upon the pipe by reason of the friction between the inner end of the coupling nut and the adjacent end of the coil. As the other end of the coil is positioned within the tapering bore of the sleeve it will be firmly clamped in place between the sleeve and the pipe thereby preventing the gripping member from being rotated bodily about the pipe as the coupling nut is screwed into position. This clamping action is intensified by reason of the fact that the screwing of the coupling nut into position tends to draw the sleeve towards the end of the pipe. The contraction of the gripping member by the assembling of the coupling members serves to coil it so tightly about the pipe that it cannot be moved longitudinally with respect thereto, and as the ends of the gripping member are in engagement with the coupling members it follows that the coupling member and pipe will be held positively against relative movement. As the coupling nut is screwed into position the packing 10 will be compressed between the shoulder 9 and the end of the pipe thus forming a fluid-tight joint which prevents leakage and also prevents the liquid from entering between the tubular members of the pipe.

In Figure 3 the coupling is shown as applied to a hose 15 of rubber or other flexible material. In order to prevent the hose from collapsing under the pressure exerted by the gripping member when the coupling is assembled, a thimble 16 of metal or the like is first forced into the end of the hose after which the coupling is applied in the manner above described.

Should the pipe become ruptured adjacent to the coupling it is merely necessary to remove the coupling nut and slide the sleeve along the pipe past the ruptured portion. The gripping member may then be grasped by the hand and twisted in a reverse direction to cause it to uncoil or expand sufficiently to permit it also to be slid along the pipe past the ruptured portion, after which the damaged portion of the pipe may be cut off and the coupling re-assembled.

While I have described but one preferred embodiment of my invention, it is to be understood that I do not intend to limit myself thereto, but that I intend to cover my invention broadly in whatever form its principle may be employed.

Having thus described my invention I claim:

1. A coupling of the character described comprising a member adapted to surround a hose and about the end face thereof, another member also adapted to surround the hose, said members being provided with cooperating threads and the bore of the latter of said members having an unthreaded portion, and coiled gripping means composed of a plurality of turns of wire located in said unthreaded portion of said bore between said members and arranged to be pressed into forcible gripping engagement with the hose as said coupling members are screwed together.

2. A coupling of the character described comprising a member adapted to surround a hose and provided with a shoulder for engaging the end of the latter, another member also adapted to surround the hose, said members being provided with cooperating threads and the bore of the latter of said members being tapered, and coil spring gripping means composed of a plurality of turns of wire located in said tapered bore between said members and capable of being compressed into forcible engagement with the hose as said coupling members are screwed together.

3. A coupling of the character described comprising a member adapted to surround a hose and provided with a shoulder for engaging the end of the latter, another member also adapted to surround the hose, said members being provided with cooperating threads and the bore of one of said members being tapered, and gripping means in the form of a flexible metal helix having more than one turn located in said tapered bore between said members and arranged to be compressed into forcible engagement with the hose as said coupling members are screwed together.

4. A coupling of the character described comprising a member adapted to surround a hose, another member also adapted to surround the hose, said members being provided with cooperating threads and the bore of one of said members being tapered, and a helically wound wire located in said tapered bore between said members and arranged to be compressed into forcible engagement with the hose as said coupling members are screwed together.

5. A coupling of the character described, comprising a sleeve provided with a bore having a threaded portion and a tapering portion, gripping means in the form of a spiral having a plurality of turns positioned within said sleeve and having one of its ends extending into the tapering portion of the bore, and a coupling nut having a threaded portion adapted to be received within the threaded portion of the bore of said sleeve and to engage the other end of said gripping means.

6. A coupling of the character described, comprising a sleeve provided with a bore having a threaded portion and a tapering portion, helical gripping means positioned within said sleeve and having one of its ends extending into the tapering portion of the bore, and a coupling nut having a threaded portion adapted to be received within the threaded portion of the bore of said sleeve and to engage the other end of said helical gripping means, the coils of said helical gripping means extending in the same direction as the threads of said bore, whereby said gripping means will be wound up as the nut is screwed into the sleeve.

7. The combination of a pipe and a coupling; said coupling comprising a sleeve slidably mounted upon said pipe, contractible helical gripping means within said sleeve and encircling said pipe, and a coupling nut surrounding said pipe and adapted to be screwed into said sleeve and to contract said gripping means.

8. The combination of a pipe and a coupling; said coupling comprising a sleeve slidably mounted upon said pipe, contractible helical gripping means within said sleeve and encircling said pipe, and a coupling nut surrounding said pipe and adapted to be screwed into said sleeve and to contract said gripping means, said gripping means serving to hold said sleeve and said coupling nut against longitudinal movement relative to said pipe.

9. The combination of a pipe and a coupling; said coupling comprising a sleeve slidably mounted upon said pipe, coiled wire gripping means within said sleeve and encircling said pipe, and a coupling nut surrounding said pipe and adapted to be screwed into said sleeve and to coil said gripping means tightly around said pipe.

10. The combination of a pipe and a coupling; said coupling comprising a sleeve slidably mounted upon said pipe, coiled wire gripping means within said sleeve and encircling said pipe, one of the ends of said gripping means being clamped between said sleeve and said pipe, and a coupling nut surrounding said pipe and adapted to be screwed into said sleeve and to engage the other end of said gripping means and to actuate the same to coil said gripping means more tightly around said pipe.

11. A hose coupling of the character described comprising a sleeve member, having at one end an internal diameter substantially the same as the external diameter of the hose to which the coupling is to be applied and at the other end having a considerably larger diameter and being internally threaded, the intermediate portion of said sleeve member being internally tapered, a coupling nut having at one end a portion adapted to surround the hose and provided with a shoulder for engaging the end of the latter, the external surface of this portion of the coupling nut being provided with threads adapted to engage the threaded portion of the sleeve member, and a gripping member comprising a helical coil of wire having a diameter substantially the same as the diameter of the hose, adapted to be engaged by the internally tapered portion of said sleeve and by the end of the coupling nut and thereby compressed into forcible engagement with the hose as the sleeve member and coupling nut are screwed together on the end of the hose.

SAMUEL LEVITT.